(12) United States Patent
Yu et al.

(10) Patent No.: US 9,372,715 B2
(45) Date of Patent: Jun. 21, 2016

(54) PRIORITY LEVEL ARBITRATION METHOD AND DEVICE

(75) Inventors: Jinqing Yu, Shenzhen (CN); Lisheng Xiao, Shenzhen (CN); Dewei Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 446 days.

(21) Appl. No.: 13/522,542

(22) PCT Filed: May 31, 2011

(86) PCT No.: PCT/CN2011/075011
§ 371 (c)(1),
(2), (4) Date: Jul. 17, 2012

(87) PCT Pub. No.: WO2012/000365
PCT Pub. Date: Jan. 5, 2012

(65) Prior Publication Data
US 2013/0091505 A1    Apr. 11, 2013

(30) Foreign Application Priority Data

Jun. 28, 2010  (CN) .......................... 2010 1 0212235

(51) Int. Cl.
*G06F 9/46* (2006.01)
*G06F 9/50* (2006.01)

(52) U.S. Cl.
CPC ................ *G06F 9/46* (2013.01); *G06F 9/5038* (2013.01); *G06F 2209/5021* (2013.01)

(58) Field of Classification Search
None
See application file for complete search history.

(56) References Cited

U.S. PATENT DOCUMENTS

| 4,314,335 | A | | 2/1982 | Pezzi |
| 4,450,321 | A | * | 5/1984 | Quigley ............... G10K 11/175 381/73.1 |
| 5,958,036 | A | | 9/1999 | Burns et al. |
| 6,658,447 | B2 | * | 12/2003 | Cota-Robles ................ 718/103 |
| 7,773,621 | B2 | * | 8/2010 | Jensen ........................ 370/412 |
| 2008/0059674 | A1 | | 3/2008 | Shi et al. |
| 2010/0115167 | A1 | | 5/2010 | Tardieux et al. |

FOREIGN PATENT DOCUMENTS

| CN | 1581125 A | 2/2005 |
| CN | 1912857 A | 2/2007 |
| CN | 101887382 A | 11/2010 |

OTHER PUBLICATIONS

International Search Report for PCT/CN2011/075011 dated Aug. 2, 2011.

* cited by examiner

*Primary Examiner* — Mengyao Zhe
(74) *Attorney, Agent, or Firm* — Ling Wu; Stephen Yang; Ling and Yang Intellectual Property

(57) ABSTRACT

The present invention discloses a method and device for arbitrating priority levels. The method comprises: setting a plurality of first stage polling arbiters and a second stage priority level arbiter respectively, wherein the number of the first stage polling arbiters is equal to the number of priority levels contained in a plurality of source ends; receiving task request signals for requesting tasks from the plurality of source ends and assigning request tasks with the same priority level to the same first stage polling arbiter; each of the first stage polling arbiters polling the received request tasks with the same priority level respectively to obtain one request task and transmitting the request task to the second stage priority level arbiter; and the second stage priority level arbiter receiving the plurality of request tasks and outputting an output result of request tasks with the highest priority level to a destination end.

12 Claims, 6 Drawing Sheets

PRIORITY LEVEL ARBITRATION METHOD AND DEVICE

TECHNICAL FIELD

The present invention relates to the field of communication, and more particularly, to a method and device for arbitrating priority levels.

BACKGROUND OF THE RELATED ART

In design, there three corresponding relationships between source ends and destination ends: one-to-one, one-to-many and many-to-one. The relationship between multiple source ends and one destination end is the most complicated, and a circuit structure thereof is shown in FIG. 1. The multiple source ends are connected to the destination end through a multiplexer (MUX), and a set of arbitration mechanism is required to assist operation, so as to guarantee time-sharing exchanging of data between the multiple source ends and the destination end.

The basic principle of the arbitration mechanism is to generate gating signals based on request signals of each source end according to a certain arbitration principle such that time-sharing exchanging of data between the corresponding source end and the destination end can be achieved. The arbitration principle is generally classified into three types: fixed priority level, cyclic priority level and polling priority level.

1. Fixed priority level. As shown in FIG. 2, the priority level of each source is specified. In this figure, 0 represents the highest priority level, and 2 represents the lowest priority level. Whenever arbitration is performed, requests of the source ends are responded in an order of priority levels from high to low. For example, when source 0 and source 2 request data simultaneously, according to the priority level rule, the priority level of source 0 is higher than that of source 2, thus requests of source 0 are firstly responded. After the requests of source 0 have been responded, only when it is determined that both source 0 and source 1 have no request, requests of source 2 will be responded.

2. Cyclic priority level. As shown in FIG. 3, whenever a source end with the highest priority level is responded, this source end will be set as the lowest priority level and priority levels of the remaining source ends are increased in sequence such that each source end can obtain an equal priority level in cycles. In this figure, 0 represents the highest priority level, and 2 represents the lowest priority level. Whenever arbitration is performed, requests of the source ends are responded in an order of current priority levels from high to low. For example, when source 0 and source 2 request data simultaneously, firstly the priority level of source 0 is set as 0 and the priority level of source 2 is set as 2, the priority level of source 0 is higher than that of source 2, thus requests of source 0 are firstly responded. After the requests of source 0 have been responded, the priority level of source 0 is reset as 2, the priority level of source 1 is reset as 0 and the priority level of source 2 is reset as 1. In this case, as long as it is determined that source 1 has no request, requests of source 2 will be responded, regardless of the requests of source 0.

3. Polling priority level. As shown in FIG. 4, source 0, source 1 and source 2 are at the same priority level. For example, if multiple tasks are request simultaneously at each source, they will be processed as follows: one task of the source 0, source 1 and source 2, respectively, is output, if tasks of one of the sources, e.g., source 0, have been processed, and source 0 no longer requests arbitration, then tasks of source 1 and source 2 are output next time. Likewise, if source 2 no longer requests output, then requests of source 0 and source 1 are output and arbitrated.

It can be seen from the above description that processing processes of the three arbitration mechanisms are simplex, and can not configure processing modes of the arbitration mechanisms flexibly according to requirements of data. If requests of more sources are required to be processed simultaneously, the processing efficiency will be decreased, and the transportability is not high.

SUMMARY OF THE INVENTION

The present invention provides a method and device for arbitrating priority levels capable of using arbitration principles flexibly to improve the processing efficiency and achieve high transportability.

A method for arbitrating priority levels according to an embodiment of the present invention comprises:

setting a plurality of first stage polling arbiters and a second stage priority level arbiter respectively, wherein the number of the first stage polling arbiters is equal to the number of priority levels contained in a plurality of source ends;

receiving task request signals for requesting tasks from the plurality of source ends, and assigning request tasks with the same priority level to the same first stage polling arbiter;

each of the first stage polling arbiters polling the received request tasks with the same priority level respectively to obtain one request task, and transmitting the request task to the second stage priority level arbiter; and the second stage priority level arbiter receiving the plurality of request tasks, and outputting an output result of request tasks with the highest priority level to a destination end.

Before setting the first stage polling arbiters and the second stage priority level arbiter respectively, the method further comprises presetting the priority levels of the plurality of source ends respectively.

The step of assigning the request tasks with the same priority level to the same first stage polling arbiter further comprises:

assigning the request tasks with the same priority level from the same source end to a corresponding first stage polling arbiter in sequence.

If a command for changing the priority level of the request tasks is received, the step of assigning the request tasks with the same priority level to the same first stage polling arbiter further comprises:

if the request tasks have been processed by the corresponding first stage polling arbiter or are not sent to the corresponding first stage polling arbiter, changing the priority level of the request tasks, and assigning the request tasks to the corresponding first stage polling arbiter according to the changed priority level;

if the request tasks have been sent to the corresponding first stage polling arbiter and are not processed, not changing the priority level of the request tasks; or if the first stage polling arbiter corresponding to the previous priority level of the request tasks is in an idle state, changing the priority level of the request tasks, and assigning the request tasks to the corresponding first stage polling arbiter according to the changed priority level;

if the first stage polling arbiters corresponding to the previous priority level of the request tasks is in a busy state, not changing the priority level of the request tasks.

After the second stage priority level arbiter outputs the request tasks with the highest priority level to the destination end, the method further comprises:

the second stage priority level arbiter returning the output result to the corresponding first stage polling arbiter; and the corresponding first stage polling arbiter polling and transmitting one request task to the second stage priority level arbiter.

A device for arbitrating priority levels according to an embodiment of the present invention comprises a priority level mapping requesting and holding unit, a plurality of first stage polling arbiters and a second stage priority level arbiter; wherein the priority level mapping requesting and holding unit is configured to receive task request signals for requesting tasks from a plurality of source ends, and assign request tasks with the same priority level to the same first stage polling arbiter; wherein the number of the first stage polling arbiters is equal to the number of priority levels contained in the plurality of source ends;

the plurality of first stage polling arbiters each are configured to poll the received request tasks with the same priority level respectively to obtain one request task, and transmit the request task to the second stage priority level arbiter; and the second stage priority level arbiter is configured to receive the plurality of request tasks from the plurality of first stage polling arbiters, and output an output result of request tasks with the highest priority level to a destination end.

The device further comprises:

a setting unit configured to set priority levels of the plurality of source ends respectively.

The device further comprises:

a plurality of priority level request processing units connected to the priority level mapping requesting and holding unit and the plurality of first stage polling arbiters respectively, and configured to assign the request tasks with the same priority level from the same source end to a corresponding first stage polling arbiter in sequence.

The device further comprises:

a plurality of configuring priority level command validation units connected to the setting unit, the priority level mapping requesting and holding unit and the plurality of priority level request processing units, and configured to, after receiving a command of the setting unit for changing the priority level of the request tasks, if the request tasks have been processed by the corresponding first stage polling arbiter or are not sent to the corresponding first stage polling arbiter, change the priority levels of the request tasks, and assign the request tasks to the corresponding first stage polling arbiter according to the changed priority level; and if the request tasks have been sent to the corresponding first stage polling arbiter and are not processed, not change the priority level of the request tasks; or if the first stage polling arbiter corresponding to the previous priority level of the request tasks is in an idle state, change the priority level of the request tasks, and assign the request tasks to the corresponding first stage polling arbiter according to the changed priority level; and if the first stage polling arbiter corresponding to the previous priority level of the request tasks is in a busy state, not change the priority level of the request tasks.

The second stage priority level arbiter is further configured to, after outputting the request tasks with the highest priority level to the destination end, return the output result to the corresponding first stage polling arbiter; and the corresponding first stage polling arbiter is further configured to poll and transmit one request task to the second stage priority level arbiter.

Compared with the prior art, according to the technical scheme of the present invention described above, the present invention integrates two arbitration mechanisms, fixed priority level and polling mode, and uses a hierarchical arbitration processing structure so as to achieve efficiency first and high transportability such that time and processing mode used by dynamic priority level arbitration will not increase with the increase of the number of the source ends, thereby overcoming a defect of insufficient efficiency in implementation of typical priority level arbitration. Furthermore, the present invention also integrates a dynamic priority level arbitration mechanism and can configure the priority levels of the source ends flexibly according to actual requirements, thereby achieving the dynamic priority level arbitration mechanism and taking fairness into consideration.

BRIEF DESCRIPTION OF DRAWINGS

The accompanying drawings illustrated herein, which form part of the present invention, are used to provide a further understanding of the present invention. Exemplary embodiments of the present invention and their description are intended to explain the present invention, and not to limit the present invention improperly. In the drawings.

PREFERRED EMBODIMENTS OF THE PRESENT INVENTION

The present invention put forwards a hierarchical arbitration processing structure including a polling mode and a fixed priority level, which can achieve efficiency first and high transportability such that time and processing mode used by the priority level arbitration will not increase with the increase of the number of source ends. Furthermore, the present invention can configures priority levels of the source ends flexibly according to actual requirements so as to implement a technical scheme of a dynamic priority level arbitration mechanism. The present invention can integrate three arbitration mechanisms, fixed priority level, polling mode and dynamic priority level, and achieve efficiency first and consideration to fairness by configuring the priority levels such that the time and processing mode used by the dynamic priority level arbitration will not increase with the increase of the number of the source ends, thereby overcoming a defect of insufficient efficiency in implementation of typical priority level arbitration.

In order to make objects, technical schemes and advantages of the present invention more clear, the present invention will be further described in detail in combination with the accompanying drawings and specific embodiments below.

According to an embodiment of the present invention, a method for arbitrating priority levels is provided.

Figure 1:
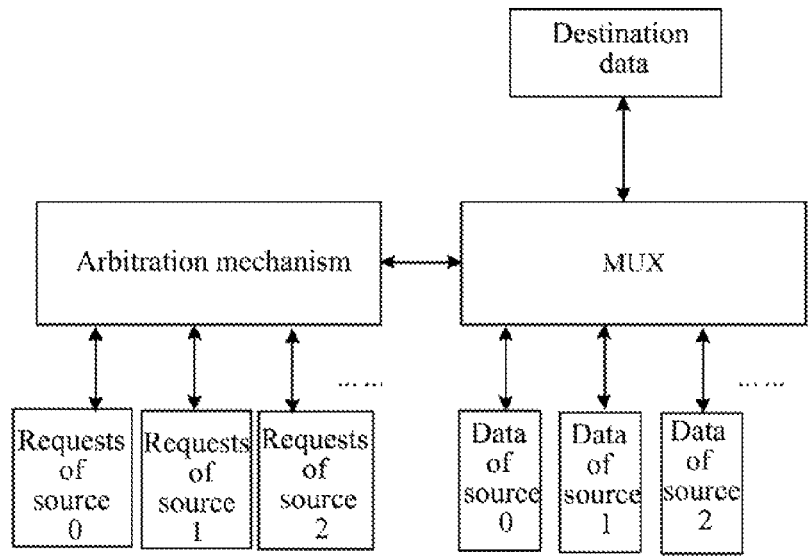
FIG. 1 is a schematic diagram of a typical application scenario of the existing arbitration mechanism.
Figure 2:
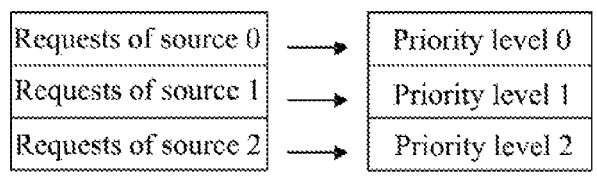
FIG. 2 is an elementary diagram of the existing fixed priority level arbitration.
Figure 3:
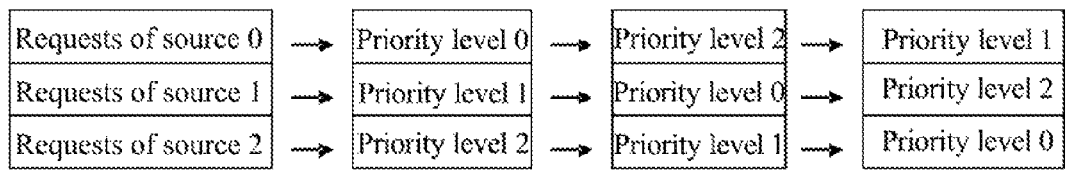
FIG. 3 is an elementary diagram of the existing cyclic priority level arbitration.
Figure 4:
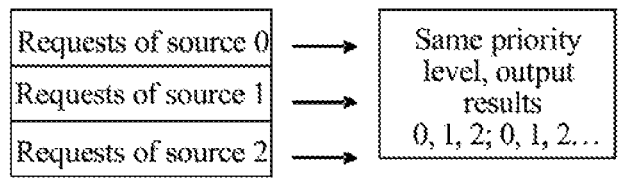
FIG. 4 is an elementary diagram of the existing polling arbitration.
Figure 5:
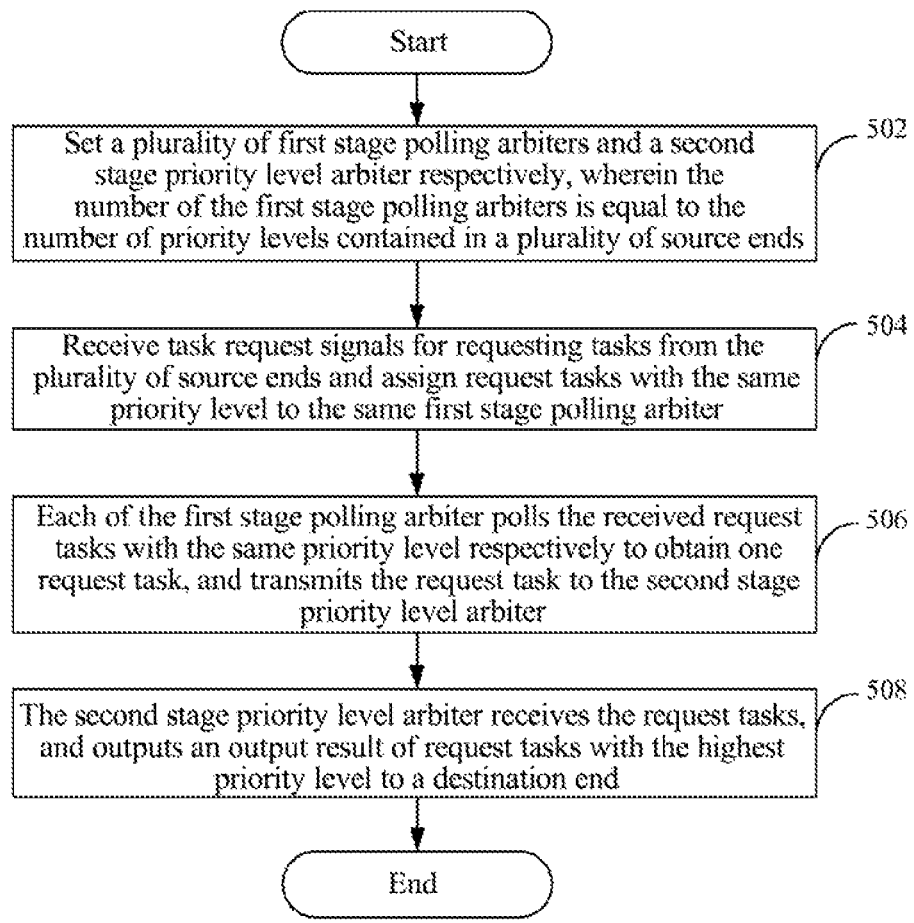
FIG. 5 is a flow chart of a method for arbitrating priority levels according to an embodiment of the present invention.

FIG. 5 is a flow chart of a method for arbitrating priority levels according to the embodiment of the present invention. As shown in FIG. 5, the method comprises the following steps.

In step 502, a plurality of first stage polling arbiters and a second stage priority level arbiter are set respectively, wherein the number of the first stage polling arbiters is equal to the number of priority levels contained in a plurality of source ends.

In step 504, task request signals for requesting tasks from the plurality of source ends are received, and request tasks with the same priority level are assigned to the same first stage polling arbiter.

In step 506, each of the first stage polling arbiter polls the received request tasks with the same priority level respectively to obtain one request task, and transmits the request task to the second stage priority level arbiter.

In step 508, the second stage priority level arbiter receives the request tasks, and outputs an output result of request tasks with the highest priority level to a destination end.

The technical scheme described above integrates a two-stage arbitration processing structure including fixed priority level and polling mode, which can be grouped and processed hierarchically. In the case of a large number of request tasks, compared with the existing simplex arbitration mechanism, the processing efficiency is improved.

Furthermore, in the case that the number of the source ends is increased and the number of the priority levels is unchanged, the number of the arbiters and arbitration processing procedure will not be influenced; and in the case that the number of the source ends is unchanged and the number of the priority levels is increased, only one polling arbiter is required to be duplicated simply, and the arbitration processing procedure is still unchanged. In conclusion, the transportability of the technical scheme of the present invention is high.

Preferably, prior to beginning of each round of arbitration processing, the priority levels of the source ends can be configured flexibly according to actual requirements, thus fairness can also be taken into consideration.

Details of each processing mentioned above will be described in detail below.

I. The number of the sources to be arbitrated and the number of the priority levels are determined.

1. The number of the sources to be arbitrated is determined according to a read-write concurrent ability of the destination end. For example, reading and writing data at the destination end can be accomplished simultaneously, and reading data requests and writing data requests of the source ends are arbitrated respectively. At this point, each arbitration mechanism only counts the number of source ends performing one type of request operation.

2. The sources to be arbitrated are ordered such that each source can obtain a unique sequence number. The order of the sequence number is also the order by which the requests are output when the arbitration mechanism polls the arbitration processing.

3. The number of the priority levels of the sources to be arbitrated is determined according to the number of the source ends and importance of the requesting sources.

II. Validation time of a priority level of requests of each source is determined.

Whether a priority level of requests of a source is required to be updated is determined according to whether the requests of the source end have been completed. If requests of a certain source are not been sent to an arbiter previously or the sent requests have been responded, the priority level configured externally outside the requests of the source is chosen (regardless of changes in the priority level); otherwise, the priority level of the source end is maintained. Or, the validation time of the propriety level can be determined according to whether the first stage arbiter is busy. If the previous priority level corresponding to source 0 is 0, then now its priority level is required to be set as 1 externally, and whether the first stage arbiter mapped by the current priority level 0 is busy is determined, and if yes, the priority level of source 0 is maintained as 0, otherwise, the priority level of source 0 is updated as 1.

III. A two-stage arbiter is set, the first stage arbitration is processed using polling, and the second stage arbitration is processed using priority.

1. A polling priority level arbiter is designed. For example, if source 0 requests 3 tasks to be processed simultaneously, if the number of request tasks of source 1 is 2, and if the number of request tasks of source 2 is 3, and priority levels of source 1, source 2 and source 3 are identical, then orders output by the arbitration response are 0, 1, 2; 0, 1, 2; 0, 2.

2. A priority level arbiter is designed. For example, if the number of request tasks of source 0 is 3, and its corresponding priority level 0 is the highest; if the number of request tasks of source 1 is 2, and its corresponding priority level 1 is the second highest; and if the number of request tasks of source 2 is 3, and its corresponding priority level 0 is the lowest, then the order output by the arbitration response is 0, 0, 0; 1, 1; 2, 2, 2.

IV. The number of the first stage arbiters is set according to the number of the configured priority levels (each priority level being mapped to one first stage arbiter), and the number of first stage arbitrations is set according to the number of the arbitration priority levels determined in step I. That is, each priority level is mapped to one polled arbiter.

V. The request tasks with the same priority level are assigned to the corresponding first stage arbiter for processing according to the validation time determined in step II.

1. A one-to-one mapping relationship between the source ends and polling arbiters is established according to the validation time of the priority level of the requests of the source end in step II and the priority level corresponding to the polling arbiter in step IV.

2. Whether the sources have task requests is determined, if yes, one request of each source is sent to its corresponding polling arbiter, meanwhile, the number of requests of the source end of each polling arbiter is collected (no matter how many requests there are at each source, only one request is responded each time) to send to the polling arbiter for arbitrating.

VI. Each of the first stage arbiters outputs one arbitration result to the second stage arbiter in the polling mode. In the first stage arbiter, the number of the requests of the source counted in step V is output and the arbitration result is output in the polling processing mode in step III.

VII. After receiving the request tasks of the first stage arbiters, the second stage arbiter outputs a task with the highest priority level according to the priority levels of the tasks. The second stage arbiter (a complete priority level arbiter) outputs the arbitration result output by the first stage arbiter in step VI in the complete priority level processing mode in step III.

VIII. The result output in step VII is fed back to the first stage arbiter to indicate that the task has been responded by the second stage arbiter, and then another task request with the same priority level is polled and output.

1. The arbitration result output in step VII is fed back to the corresponding first stage arbiter according to its corresponding bit. For example, a bit corresponding to source 0 is $0^{th}$ bit, a bit corresponding to source 1 is $1^{st}$ bit, and a bit corresponding to source 2 is $2^{nd}$ bit.

2. The output response result fed back to the first stage arbiter is transmitted to the corresponding first stage arbiter. Meanwhile, request tasks of the corresponding source are eliminated and 1 is subtracted from the total number of requests of the source (or the bit is cleared).

VIII. If all tasks of the first stage arbiters with a certain priority level have been processed, the procedure returns to step II; otherwise, the procedure returns to step VI to continue the arbitration. For example, whether the output result in step VIII is zero is determined, and if it is 0, it is shown that the polling priority level arbitration processing has processed the number of requests of the source collected in step IV, and the procedure returns to the step II to wait for new requests of the source. If it is not 0, it is shown that the task requests have not been responded, and the procedure returns to the step VI to continue the arbitration.

Efficiency first and consideration to fairness is achieved by the processing described above, by integrating three arbitration mechanisms, fixed priority level, polling mode and dynamic priority level, and by configuring the priority levels.

According to an embodiment of the present invention, a device for arbitrating priority levels is also provided.

Figure 6:
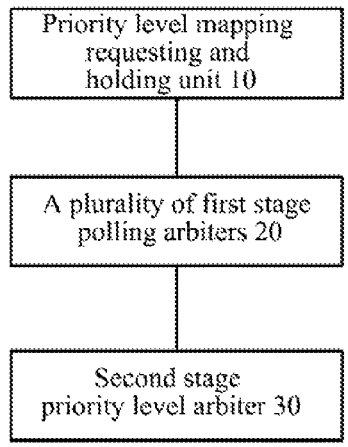
FIG. 6 is a block diagram of a device for arbitrating priority levels according to an embodiment of the present invention.

FIG. 6 is a block diagram of a device for arbitrating priority levels according to the embodiment of the present invention.

As shown in FIG. 6, the device comprises a priority level mapping requesting and holding unit 10 configured to receive task request signals for requesting tasks from a plurality of source ends, and assign request tasks with the same priority level to the same first stage polling arbiter, wherein the number of the first stage polling arbiters is equal to the number of priority levels contained in the plurality of source ends; a plurality of first stage polling arbiters 20 each configured to poll the received request tasks with the same priority level respectively to obtain one request task, and transmit the request task to the second stage priority level arbiter; and a second stage priority level arbiter 30 configured to receive the plurality of request tasks from the plurality of first stage polling arbiters, and output an output result of request tasks with the highest priority level to a destination end.

Preferably, the embodiments of the present invention are applied to the case where a plurality of source ends corresponds to one destination end. The arbitration mechanism implemented by the embodiments of the present invention is to cause the plurality of source ends with dynamically configurable priority levels to obtain data of the destination end.

Figure 7:
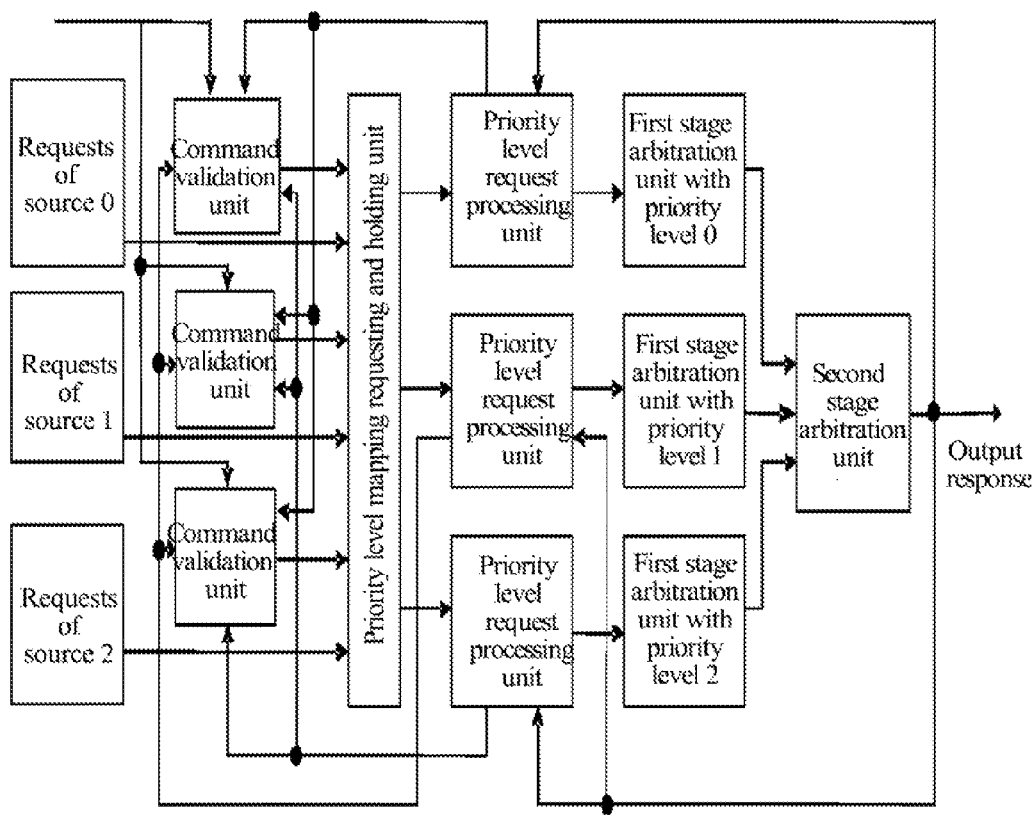
FIG. 7 is a block diagram of a preferred structure of a device for arbitrating a dynamic priority level according to an embodiment of the present invention.

The embodiments of the present invention will be described in combination with FIG. 7 to FIG. 12. According to the present invention, firstly the number of source ends to be arbitrated is determined, and the source ends to be arbitrated are ordered. FIG. 7 is a block diagram of a preferred structure of a device for arbitrating dynamic priority levels according to an embodiment of the present invention. In FIG. 7, it is assumed that 3 source ends request data from the destination end. As shown in FIG. 7, based on what shown in FIG. 6, the device also comprises a plurality of configuring priority level command validation units (i.e. command validation units), a plurality of priority level request processing units, and a setting unit (not shown in the figure) configured to set priority levels of the plurality of source ends respectively. With reference to FIG. 7, the three configuring priority level command validation units (i.e. command validation units) correspond to source 0, source 1 and source 2 respectively. Each configuring priority level command validation unit operates independently in parallel, so as to determine whether the externally configured priority level of each source is validated.

Figure 8:
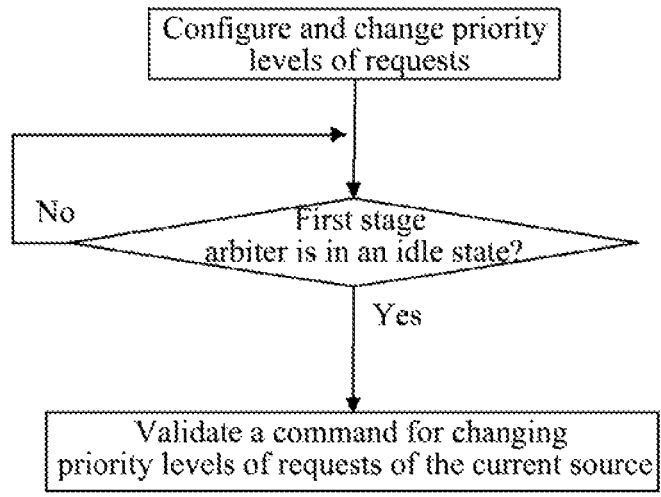
FIG. 8 is a flow chart of a work processing procedure of a command validation unit according to an embodiment of the present invention.

FIG. 8 is a flow chart of a work processing procedure of a command validation unit according to an embodiment of the present invention. Taking source 0 as an example, when a task priority level request of source 0 is required to be changed externally, a new priority level command corresponding to source 0 is output, that is, source 0 is required to update its task priority level request. After a command of the source 0 for changing the priority level is received, whether the first stage arbiter mapped by the previous priority level corresponding to source 0 is in an idle state is determined. If it is in the idle state, the new priority level command is validated, otherwise, the first stage arbiter mapped by the previous priority level corresponding to source 0 waits to enter into the idle state.

Figure 9:
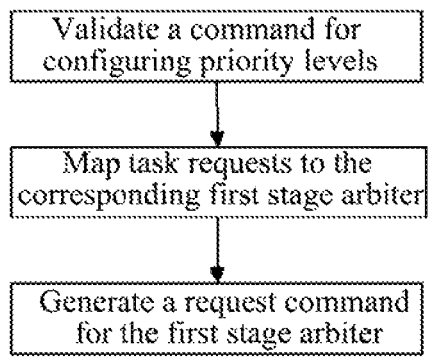
FIG. 9 is a flow chart of a work processing procedure of a priority level mapping requesting and holding unit according to an embodiment of the present invention.

FIG. 9 is a flow chart of a work processing procedure of a priority level mapping requesting and holding unit according to an embodiment of the present invention. Continue with the embodiment, source 0, source 1 and source 2 will all map their task requests to the first stage arbiters with their corresponding priority levels according to the priority levels configured by the external command. It is assumed that the priority level of source 0 is changed from priority level 0 to priority level 1 by the external command, after the configuration command is validated, the task requests of source 0 are changed from being processed by the first stage arbiter 0 to being processed by the first stage arbiter 1. Here, the first stage arbiter 0 is dedicated to process task requests with priority level of 0, and the first stage arbiter 1 is dedicated to process task requests with priority level of 1.

Figure 10:
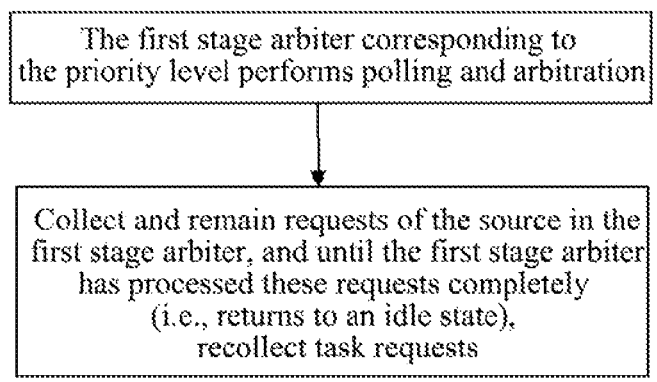
FIG. 10 is a flow chart of a work processing procedure of a priority level request processing unit according to an embodiment of the present invention.

FIG. 10 is a flow chart of a work processing procedure of a priority level request processing unit according to an embodiment of the present invention. The priority level request processing unit collects request tasks of each source into the first stage arbiter. For example, when the first stage arbiter with arbitration priority level of 0 is still arbitrating output requests or when it has arbitrated output results but the second stage arbiter has not yet responded to the first stage arbiter, the priority level request processing unit will continue to collect each task request corresponding to this priority level, otherwise, it sends the collected task requests to the corresponding first stage arbiter, while recollecting the task requests. Here, the way by which the task requests with each priority level are collects is identical.

Figure 11:
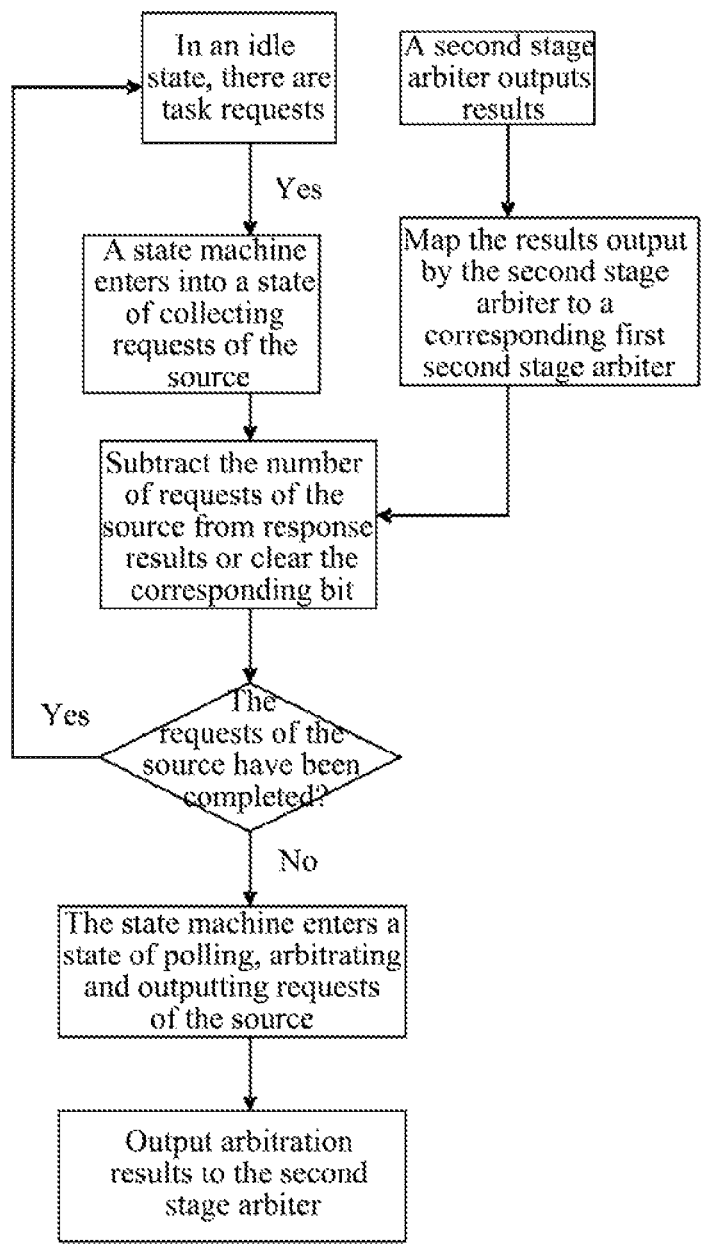
FIG. 11 is a flow chart of a work processing procedure of a first stage arbitration unit according to an embodiment of the present invention.

FIG. 11 is a flow chart of a work processing procedure of a first stage arbitration unit (i.e., a polling arbiter) according to an embodiment of the present invention. The arbiter enters into a state of collecting task requests after determining that there are external task requests, and begins to arbitrate the tasks in the polling mode after collecting them, that is, the priority level of each task request is identical. Here, taking the first stage arbiter mapped by the priority level 0 as an example, it is assumed that priority levels of source 0, source 1 and source 2 are identical and all are 0, and meanwhile source 0, source 1 and source 2 all have task requests, the arbiter only determines whether these sources have task requests and will not determine how many task requests each source has, that is, each source only sends one task request to the first stage arbiter with the corresponding priority level each time. The first stage arbiter outputs an arbitration result to the second stage arbiter in the polling mode. It is assumed that the output result of the first stage arbiter is requests of source 0, source 0 is transported to the second stage arbiter and waits the second stage arbiter to respond. If the second stage arbiter has not responded to this request, the first stage arbiter outputs this task request all the time until the second stage arbiter has responded to the request. If the second stage arbiter responds to this request, the response is fed back to the first stage arbiter to tell the first stage arbiter that the requests of source 0 have been responded, then the first stage arbiter will remove the requests of source 0, and arbitrate requests of source 1 to be responded by the second stage arbiter at the same time. In this way, after the second stage arbiter has responded to requests of source 2, the response is fed back to the first stage arbiter, and at this point the first stage arbiter determines that all requests of this task have been processed, and then the arbiter skips to the idle state to continue to wait the next task request.

Figure 12:
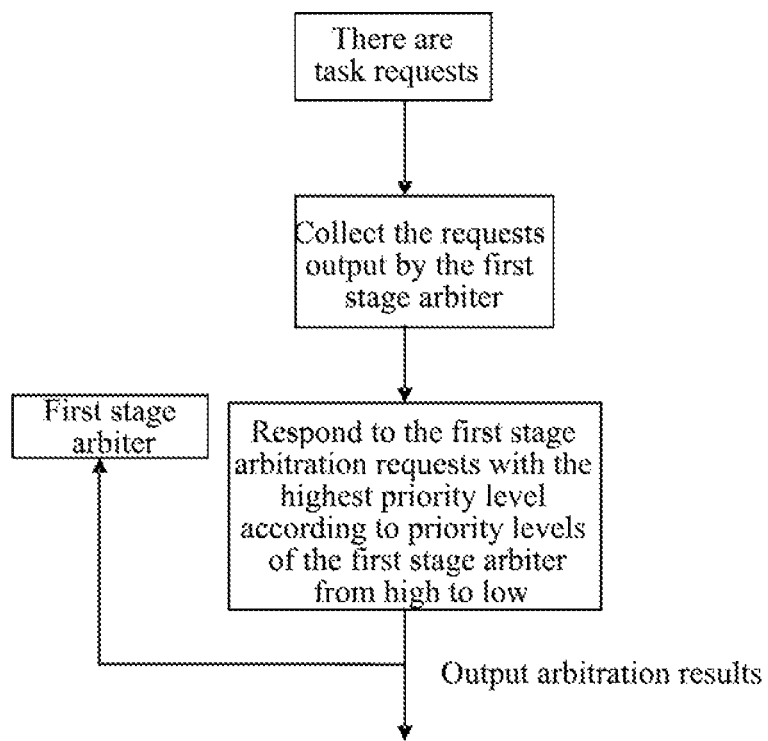
FIG. 12 is a flow chart of a work processing procedure of a second stage arbitration unit according to an embodiment of the present invention.

FIG. 12 is a flow chart of a work processing procedure of a second stage arbitration unit (i.e., a priority level arbiter) according to an embodiment of the present invention. The second stage arbiter receives output requests from the first stage arbiter in an idle state. When there are requests output by the first stage arbiter, the second stage arbiter enters into an arbitration processing state, and among all requests of the first stage arbiters, outputs the requests of the first stage arbiter with the highest priority level. Then, the second stage arbiter returns to the idle state again, continues to process the next request, and can receive another task request of the responded first stage arbiter. After outputting the requests, the second stage arbiter feeds back output results to the corresponding first stage arbiters.

In conclusion, according to the technical scheme of the present invention described above, the present invention integrates two arbitration mechanisms, fixed priority level and polling mode, and uses a hierarchical arbitration processing structure such that time and processing mode used by dynamic priority level arbitration will not increase with the increase of the number of the source ends, thereby achieving the dynamic priority level arbitration mechanism and taking fairness into consideration.

The above description is only the preferred embodiments of the present invention and is not intended to limit the present invention. Various modifications and variations to the present invention may be made by those skilled in the art. Any modification, equivalent substitution and variation made within the spirit and principle of the present invention should be covered in the scope of the appended claims of the present invention.

What is claimed is:

1. A machine implemented method for realizing a data interaction between a plurality of source ends and a destination end by arbitrating priority levels, comprising:
    each of the source ends sending task request signals including request tasks one by one in turn to one of a plurality of first stage polling arbiters, wherein a number of the first stage polling arbiters is equal to a number of priority levels preset for the plurality of source ends, a number of source ends is equal to the number of priority levels, and the request tasks sent by the source end have the same priority level with that of the source ends;
    each of the first stage polling arbiters receiving several request tasks with the same priority level from its corresponding source ends;
    each of the first stage polling arbiters polling the received request tasks with the same priority level respectively to obtain one request task, and transmitting the request task obtained by polling to a second stage priority level arbiter; and
    the second stage priority level arbiter receiving the request tasks transmitted from all of the first stage polling arbiters, and outputting to the destination end one request task that has a highest priority level, so that all the request tasks from the source ends are executed in the destination end;
    wherein, the method further comprises: when receiving a command for changing a priority level of one request task, judging whether the arbitration for the one request task has completed, and if the arbitration for the request task is completed, then changing the priority level of the one request task to a corresponding priority level according to the command.

2. The method according to claim 1, wherein before setting the first stage polling arbiters and the second stage priority level arbiter respectively, the method further comprises:
    presetting the priority level for each of source ends respectively.

3. The method according to claim 2, wherein the step of presetting the priority level for each of source ends respectively comprises:
    determining the number of the source ends to be arbitrated according to a read-write concurrent ability of the destination end;
    ordering the source ends to be arbitrated such that each source end can obtain a unique sequence number; and
    determining the number of the priority levels of the source ends to be arbitrated according to the number of the source ends and importance of the request tasks.

4. The method according to claim 1, wherein if the arbitration for the request task is completed, then changing the priority level of the request task to a corresponding priority level according to the command further comprises:
    if the request task has been processed by the corresponding first stage polling arbiter or is not sent to the corresponding first stage polling arbiter, changing the priority level of the request task, and then assigning the request task to the corresponding first stage polling arbiter according to the changed priority level;
    if the request task has been sent to the corresponding first stage polling arbiter and is not processed, not changing the priority level of the request task;
    or,
    if the first stage polling arbiter corresponding to the previous priority level of the request task is in an idle state, changing the priority level of the request task, and then assigning the request task to the corresponding first stage polling arbiter according to the changed priority level;
    if the first stage polling arbiters corresponding to the previous priority level of the request task is in a busy state, not changing the priority level of the request task.

5. The method according to claim 1, wherein after the second stage priority level arbiter outputs to the destination end said one request task that has the highest priority level, the method further comprises:
    the second stage priority level arbiter returning an output result of said one request task to the corresponding first stage polling arbiter; and the corresponding first stage polling arbiter transmitting a next request task by polling to the second stage priority level arbiter.

6. A hardware device for realizing a data interaction between a plurality of source ends and a destination end by arbitrating priority levels, comprising a priority level mapping requesting and holding unit, a plurality of first stage polling arbiters and a second stage priority level arbiter, wherein
- the priority level mapping requesting and holding unit is configured to receive task request signals including request tasks from a plurality of source ends, and assign the request tasks with the same priority level to the same first stage polling arbiter; wherein a number of the first stage polling arbiters is equal to a number of priority levels preset for the plurality of source ends, a number of source ends is equal to the number of priority levels, the request tasks sent by one of the source ends have the same priority level with that of the source ends, and each of the source end sends the request tasks to the first stage polling arbiter with its corresponding priority level one by one in turn;
- each of the plurality of first stage polling arbiters is configured to poll the received request tasks with the same priority level respectively to obtain one request task, and transmit the request task obtained by polling to a second stage priority level arbiter; and
- the second stage priority level arbiter is configured to receive the request tasks transmitted from all of the first stage polling arbiters, and output to the destination end one request task that has the highest priority level, so that all the request tasks from the source ends are executed in the destination end;
- wherein, the device further comprises a plurality of configuring priority level command validation units connected to the priority level mapping requesting and holding unit and the corresponding first stage polling arbiters, and each of the configuring priority level command validation units is configured to, when one of the source ends receives a command for changing the priority level of one request task, judging whether the arbitration for the one request task has completed, and if the arbitration for the request task is completed, then changing the priority level of the one request task to a corresponding priority level according to the command.

7. The device according to claim 6, further comprising:
a setting unit configured to set the priority level for each of source ends respectively.

8. The device according to claim 7, further comprising:
a plurality of priority level request processing units connected to the priority level mapping requesting and holding unit, the plurality of first stage polling arbiters and the plurality of configuring priority level command validation units respectively, and configured to assign the request tasks with the same priority level from the same source end to a corresponding first stage polling arbiter one by one in turn.

9. The device according to claim 8, wherein,
the plurality of configuring priority level command validation units are further connected to the setting unit, as well as the corresponding first stage polling arbiters through the-corresponding priority level request processing units, and is further configured to, after receiving the command from the setting unit for changing the priority level of one request task,
if the request task has been processed by the corresponding first stage polling arbiter or is not sent to the corresponding first stage polling arbiter, change the priority levels of the request task, and assign the request task to the corresponding first stage polling arbiter according to the changed priority level; and if the request task has been sent to the corresponding first stage polling arbiter and is not processed, not change the priority level of the request task; or,
if the first stage polling arbiter corresponding to the previous priority level of the request task is in an idle state, change the priority level of the request task, and assign the request task to the corresponding first stage polling arbiter according to the changed priority level; and if the first stage polling arbiter corresponding to the previous priority level of the request task is in a busy state, not change the priority level of the request task.

10. The device according to claim 6, wherein the second stage priority level arbiter is further configured to, after outputting to the destination end said one request task that has the highest priority level, return an output result of said one request task to the corresponding first stage polling arbiter; and the corresponding first stage polling arbiter is further configured to transmit a next request task by polling to the second stage priority level arbiter.

11. The device according to claim 7, wherein the setting unit is configured to:
- determine the number of the source ends to be arbitrated according to a read-write concurrent ability of the destination end;
- ordering the source ends to be arbitrated such that each source end can obtain a unique sequence number; and
- determine the number of the priority levels of the source ends to be arbitrated according to the number of the source ends and importance of request tasks.

12. The device according to claim 8, wherein each of the priority level request processing units is further configured to:
- collect request tasks from each of the source ends having the same priority level with the corresponding first stage polling arbiter in order, count the number of the collected request tasks from each of the source ends, and after the corresponding first stage polling arbiter finishes the arbitration for the request tasks of all the source ends in that first stage polling arbiter, send another request task of each source end to that first stage polling arbiter according to the order.

* * * * *